(12) United States Patent
Tsutoh

(10) Patent No.: US 7,252,287 B2
(45) Date of Patent: Aug. 7, 2007

(54) CURVED GUIDE FOR RADIATION IMAGE READING DEVICE

(75) Inventor: Satoru Tsutoh, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 286 days.

(21) Appl. No.: 10/329,758

(22) Filed: Dec. 27, 2002

(65) Prior Publication Data

US 2003/0155706 A1    Aug. 21, 2003

(30) Foreign Application Priority Data

Dec. 28, 2001  (JP) ............................. 2001-399722
Mar. 25, 2002  (JP) ............................. 2002-082851
Dec. 11, 2002  (JP) ............................. 2002-359432

(51) Int. Cl.
    *G03B 42/02* (2006.01)
(52) U.S. Cl. ................ 271/274; 271/273; 271/272; 250/589
(58) Field of Classification Search ............... 271/272, 271/273, 274; 250/589
    See application file for complete search history.

(56) References Cited

U.S. PATENT DOCUMENTS

| | | | |
|---|---|---|---|
| 4,179,112 A * | 12/1979 | Breuers et al. ............ | 271/3.19 |
| 4,667,102 A * | 5/1987 | Koyama et al. ............ | 250/589 |
| 4,754,292 A | 6/1988 | Itakura et al. | |
| 4,840,369 A * | 6/1989 | Takahashi ................... | 271/276 |
| 4,848,765 A * | 7/1989 | Torii .......................... | 271/274 |
| 4,855,599 A * | 8/1989 | Ohgoda et al. ............. | 250/589 |
| 4,861,995 A * | 8/1989 | Ohgoda ...................... | 250/589 |
| 4,931,641 A * | 6/1990 | Ohgoda ...................... | 250/589 |
| 5,061,852 A * | 10/1991 | Kawai ......................... | 250/589 |
| 5,339,139 A * | 8/1994 | Fullerton et al. ........... | 399/203 |
| 5,842,692 A * | 12/1998 | Rutishauser ................ | 271/3.2 |
| 6,005,687 A | 12/1999 | Kawashima et al. | |
| 6,042,109 A * | 3/2000 | Klausbruckner ............ | 271/225 |
| 6,161,831 A | 12/2000 | Kusakabe et al. | |
| 6,339,226 B1 * | 1/2002 | Chikugo ..................... | 250/589 |
| 6,341,908 B1 * | 1/2002 | Johnson ...................... | 400/624 |

FOREIGN PATENT DOCUMENTS

| | | |
|---|---|---|
| EP | 1 039 338 A2 | 9/2000 |
| EP | 1 039 338 A3 | 9/2000 |
| JP | 5-45108 | 1/1988 |
| JP | 2000235238 A * | 8/2000 |

\* cited by examiner

*Primary Examiner*—Patrick Mackey
*Assistant Examiner*—Matthew J. Kohner
(74) *Attorney, Agent, or Firm*—Sughrue Mion, PLLC

(57) ABSTRACT

An auxiliary scanning feed mechanism has a pair of curved feed guides for guiding a stimulable phosphor sheet along a curved feed path, and first and second roller pairs rotatable in synchronism with each other for gripping and feeding the stimulable phosphor sheet along the curved feed path. The first and second roller pairs have respective first and second drive rollers disposed inwardly of respective curved sections of the curved feed guides and respective first and second driven rollers.

16 Claims, 12 Drawing Sheets

CURVED GUIDE FOR RADIATION IMAGE READING DEVICE

BACKGROUND OF THE INVENTION

1. Field of the Invention

The present invention relates to a sheet feeding device for feeding a sheet which is scanned in a main scanning direction by a light beam, along a feed path having a curved section. Further, the present invention relates to a radiation image reading apparatus which incorporates therein the sheet feeding device.

2. Description of the Related Art

There is known a stimulable phosphor which, when exposed to an applied radiation (X-rays, α-rays, β-rays, γ-rays, electron beams, ultraviolet radiation, or the like), stores a part of the energy of the radiation, and, when subsequently exposed to applied stimulating rays such as visible light, emits light in proportion to the stored energy of the radiation. A radiation image information recording and reproducing system uses a sheet provided with a layer of the stimulable phosphor, which is referred to as a stimulable phosphor sheet. The radiation image information recording and reproducing system records radiation image information of a subject such as a human body temporarily on the stimulable phosphor sheet, applies stimulating rays such as a laser beam or the like to the stimulable phosphor sheet, photoelectrically reads light emitted from the stimulable phosphor sheet to produce an image signal, and processes the image signal to reproduce the recorded radiation image information on a photosensitive medium such as a photographic film, or display the recorded radiation image information on a display unit such as a CRT or the like.

The radiation image information recording and reproducing system has an image reading apparatus for reading the radiation image information carried by the stimulable phosphor sheet by applying stimulating rays such as a laser beam or the like to the stimulable phosphor sheet which carries the recorded radiation image information in a main scanning direction and feeding the stimulable phosphor sheet in an auxiliary scanning direction that extends substantially perpendicular to the main scanning direction, and an image recording apparatus for recording an image based on the radiation image information on a photographic photosensitive medium by applying a laser beam to the photographic photosensitive medium in the main scanning direction based on the radiation image information obtained from the stimulable phosphor sheet and feeding the photographic photosensitive medium in the auxiliary scanning direction.

Since the medium to be scanned in the image reading apparatus and the image recording apparatus needs to be smoothly fed in the auxiliary scanning direction, the image reading apparatus and the image recording apparatus have a feed mechanism comprising a pair of rollers (nip rollers) rotatable in pressed contact with each other for feeding the medium in the auxiliary scanning direction.

One known feed mechanism of the above type is known as a light beam scanning mechanism as disclosed in Japanese patent publication No. 5-45108. The disclosed light beam scanning mechanism has a pair of rollers for gripping and feeding a medium to be scanned, the rollers being spaced from each other by a gap smaller than the thickness of the medium, and a roller displacing means for displacing at least one of the rollers to widen the gap between the rollers.

The adjustable gap is effective to prevent the medium from suffering shocks when it enters between the rollers. When the medium is not fed by the rollers, the rollers are prevented from being deformed due to the gap present therebetween. The medium to be scanned can thus be fed accurately and smoothly by the rollers in the auxiliary scanning direction.

When the feed mechanism is incorporated in image reading apparatus and image recording apparatus, the feed mechanism is specifically constructed as shown in FIG. 12 of the accompanying drawings, for example. As shown in FIG. 12, the feed mechanism has first and second roller pairs 1, 2 for gripping and feeding a sheet S such as a stimulable phosphor sheet or a photographic photosensitive sheet in an auxiliary scanning direction indicated by the arrow A, and a turn guide 3 extending through the first and second roller pairs 1, 2 for guiding the sheet S along a predetermined feed path.

The first and second roller pairs 1, 2 comprise respective drive rollers 1a, 2a which are driven to rotate about their own axes and respective driven rollers 1b, 2b movable toward and away from the respective drive rollers 1a, 2a. A light beam, such as a laser beam L, for example, is applied to the sheet S between the first and second roller pairs 1, 2 in a direction substantially perpendicular to the auxiliary scanning direction indicated by the arrow A.

The turn guide 3 has curved sections positioned upstream and downstream, respectively, of the first and second roller pairs 1, 2, each of the curved sections having a relatively large radius R of curvature. The turn guide 3 also has straight sections extending from the curved sections toward the first and second roller pairs 1, 2, the straight sections having respective lengths H1, H2. The feed mechanism has a relatively large length H3 in the horizontal direction to provide a space for feeding the sheet S therein.

In recent years, image reading apparatus and image recording apparatus of reduced size have been desired in the art, and there is a demand for a reduction in the space for feeding the sheet S in the feed mechanism, i.e., the length H3. To meet such a demand, it is necessary to reduce the radius R of curvature and also the lengths H1, H2 of the straight sections.

However, since the sheet S such as a stimulable phosphor sheet or a photographic photosensitive sheet is of high rigidity, if the radius R of curvature and the lengths H1, H2 of the straight sections are reduced, then the driven rollers 1b, 2b which are disposed inwardly of the turn guide 3 tend to be lifted out of position due to the rigidity of the sheet S. For this reason, the sheet S may not be fed accurately by the feed mechanism.

One proposal is to position free rollers near the rollers 1b, 2b for preventing the sheet S from being unduly deformed. However, if the sheet S is curled, then the sheet S impinges upon the free rollers, and the quality of the process of reading image information from and recording image information from the sheet S is lowered. The above problem also arises in feeding various sheets such as rigid sheets of paper other than stimulable phosphor sheets or photographic photosensitive sheets.

SUMMARY OF THE INVENTION

It is a major object of the present invention to provide a sheet feeding device which is capable of feeding a sheet smoothly and accurately and is of reduced size, and to provide a radiation image reading apparatus.

According to an aspect of the present invention, a sheet feeding device has a curved feed guide for guiding a sheet along a feed path having a curved section (hereinafter referred to as a curved feed path), and a roller pair for gripping and feeding the sheet along the curved feed path. The roller pair has a drive roller disposed inwardly of the curved section of the curved feed guide and a driven roller disposed in facing relation to the drive roller with the sheet interposed therebetween.

When the sheet is fed along the curved feed path, which has a small radius of curvature, the resiliency of the sheet due to its rigidity is reliably borne by the drive roller. The sheet is prevented from rising off the curved feed path due to a lift-off of the driven roller. The sheet can thus stably and accurately be fed along the curved feed path upon rotation of the roller pair, and the sheet feed device can effectively be reduced in size.

The drive roller and the driven roller are spaced from each other by a gap equal to or smaller than the thickness of the sheet when the sheet is released from the roller pair. Therefore, the drive roller and the driven roller are not kept in pressed contact with each other, and hence are reliably prevented from being unduly deformed.

The driven roller can be displaced away from the drive roller outwardly, rather than inwardly, of the curved section of the curved feed guide. Consequently, the sheet is not subject to shocks when it enters between the drive and driven rollers.

At least one guide roller is disposed inwardly of the curved section of the curved feed guide, for controlling an attitude of the sheet as it is fed along the curved feed guide. When the driven roller is displaced with respect to the drive roller, the guide roller keeps the sheet in a good attitude, and the displacement of the driven roller, i.e., the nipping action thereof, can be controlled with ease.

The curved feed guide has a radius of curvature ranging from 30 mm to 120 mm, and has a straight section having a length ranging from 0 mm to 10 mm at an end thereof near the roller pair. The curved feed guide is thus made compact in its entirety, and the sheet feeding device can easily be reduced in size and lends itself to the feeding of various different types of sheets.

According to another aspect of the present invention, a sheet feeding device has a pair of curved feed guides for guiding a sheet along a curved feed path, and first and second roller pairs for gripping and feeding the sheet along the curved feed path. The first roller pair comprises a first drive roller and a first driven roller, and the second roller pair comprises a second drive roller and a second driven roller. The sheet feeding device also has a central roller disposed between the first and second roller pairs in a position where a light beam is applied to the sheet and disposed for rolling contact with an outer curved surface of the sheet. A first central line connecting the center of the first drive roller and the center of the first driven roller and a second central line connecting the center of the second drive roller and the center of the second driven roller are inclined toward each other inwardly of curved sections of the curved feed guides. The sheet gripped between the first and second roller pairs can thus reliably be held in contact with the outer circumferential surface of the central roller. Even if the sheet is curled, the sheet can be pressed at all times against the outer circumferential surface of the central roller, so that image information recorded on the sheet can be read therefrom highly accurately, and image information can be recorded on the sheet highly accurately.

Furthermore, an end of the central roller which is held in rolling contact with the sheet and ends of the first and second drive rollers which are held in rolling contact with the sheet are spaced from each other by a gap which is equal to or greater than the thickness of the sheet. Consequently, the sheet is prevented from being unduly deformed between the central roller and the first and second roller pairs, and can smoothly be accurately be fed along the curved feed path.

According to the present invention, a radiation reading apparatus has a U-shaped feed path comprising a front feed path and a rear feed path. The front feed path holds and feeds the radiation image recording sheet which has been removed from said cassette loading region to a reading position. The front feed path has a length which is equal to at least the length of the radiation image recording sheet. The rear feed path feeds the radiation image recording sheet which has been fed to the reading position. The rear feed path has a length which is equal to at least the length of the radiation image recording sheet. While the radiation image recording sheet is being fed in an auxiliary scanning direction along a curved feed path, the radiation image recording sheet is irradiated with stimulating light to read a recorded radiation image therefrom. The space required to feed the radiation image recording sheet in the radiation image reading apparatus is effectively reduced, thus allowing the radiation image reading apparatus to be further reduced in size.

According to the present invention, a radiation image recording sheet which has been removed from a cassette loading region is held and fed downwardly along a front feed path, moves through a lowermost point, and then is fed upwardly to a reading position. The radiation image recording sheet which has been fed to the reading position is then fed upwardly along a rear feed path. The reading position is positioned upstream of the lowermost point, and hence the starting end of the front feed path may be positioned lower than the rear end of the rear feed path. Therefore, the starting end of the front feed path may be lowered, and the overall size of a radiation image reading apparatus may be reduced. While the radiation image recording sheet is being fed in an auxiliary scanning direction along a curved feed path, the radiation image recording sheet is irradiated with stimulating light to read a recorded radiation image therefrom. The space required to feed the radiation image recording sheet in the radiation image reading apparatus is effectively reduced, thus allowing the radiation image reading apparatus to be further reduced in size.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
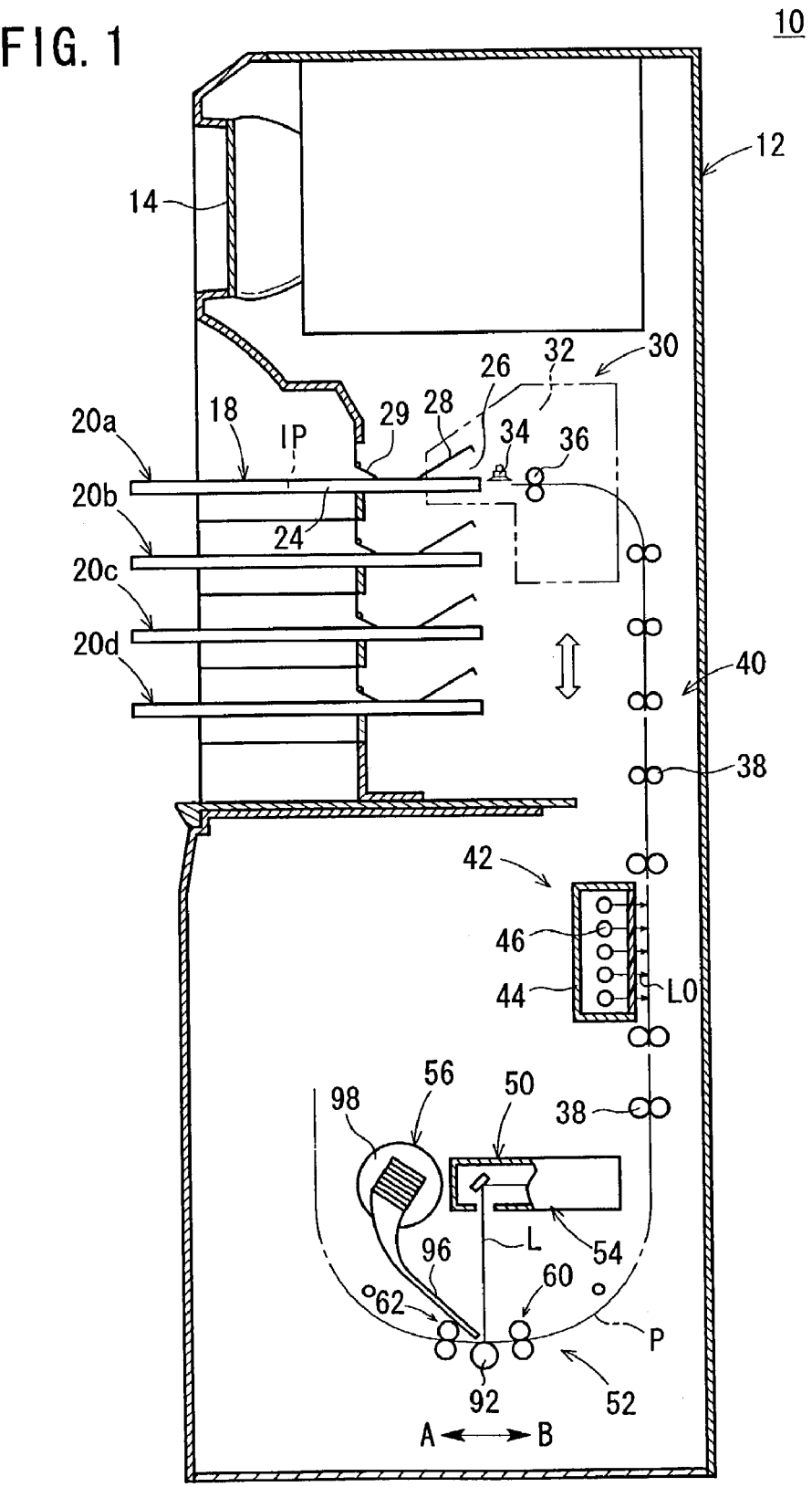
FIG. 1 is a schematic vertical cross-sectional view of a radiation image reading apparatus which incorporates therein a sheet feeding device according to the present invention.

FIG. 1 schematically shows, in vertical cross section, a radiation image reading apparatus 10 which incorporates therein a sheet feeding device according to a first embodiment of the present invention.

As shown in FIG. 1, the radiation image reading apparatus 10 has an apparatus housing 12 having on an upper portion of its front wall (operation wall) a touch panel 14 having operation and monitor functions. The apparatus housing 12 also has a plurality of, e.g., four, cassette loading regions 20a through 20d disposed below the touch panel 14 for loading and unloading respective cassettes 18. Each of the cassettes 18 comprises a casing 24 for housing a stimulable phosphor sheet IP therein, and a lid 28 for opening and closing an opening 26 defined in the casing 24. The cassette 18 has a lock means (not shown) for locking the lid 28 in a closed state on the casing 24.

The apparatus housing 12 accommodates therein a vertically movable sheet feeder 30 disposed behind a selected one of the cassette loading regions 20a through 20d for removing a stimulable phosphor sheet IP from the cassette 18 in the selected cassette loading region and returning a stimulable phosphor sheet IP from which radiation image information has been read and erased into the cassette 18. The vertically movable sheet feeder 30 has a vertically movable base 32 on which there are mounted a suction cup 34 movable into and out of the cassette 18 with the lid 28 being open and a feed roller pair 36 for receiving and feeding the stimulable phosphor sheet IP attracted by the suction cup 34.

The apparatus housing 12 also accommodates therein a feed system 40 disposed behind the vertically movable sheet feeder 30 and comprising a plurality of roller pairs 38 which jointly make up a vertical feed path, and an erasing unit 42 which is positioned along the vertical feed path below the vertically movable sheet feeder 30. The erasing unit 42 has a casing 44 housing therein a vertical array of erasing light sources 46.

The apparatus housing 12 further accommodates therein a reading unit 50 disposed below the feed system 40. The reading unit 50 comprises an auxiliary scanning feed mechanism (sheet feeding device) 52 for feeding the stimulable phosphor sheet IP removed from the cassette 18 in an auxiliary scanning direction indicated by the arrow A, an optical system 54 for applying a laser beam L to the stimulable phosphor sheet IP fed in the auxiliary scanning direction, in a main scanning direction which is substantially perpendicular to the auxiliary scanning direction, and a light collecting system 56 for photoelectrically reading light emitted from the stimulable phosphor sheet IP upon exposure to the laser beam L.

Figure 2:
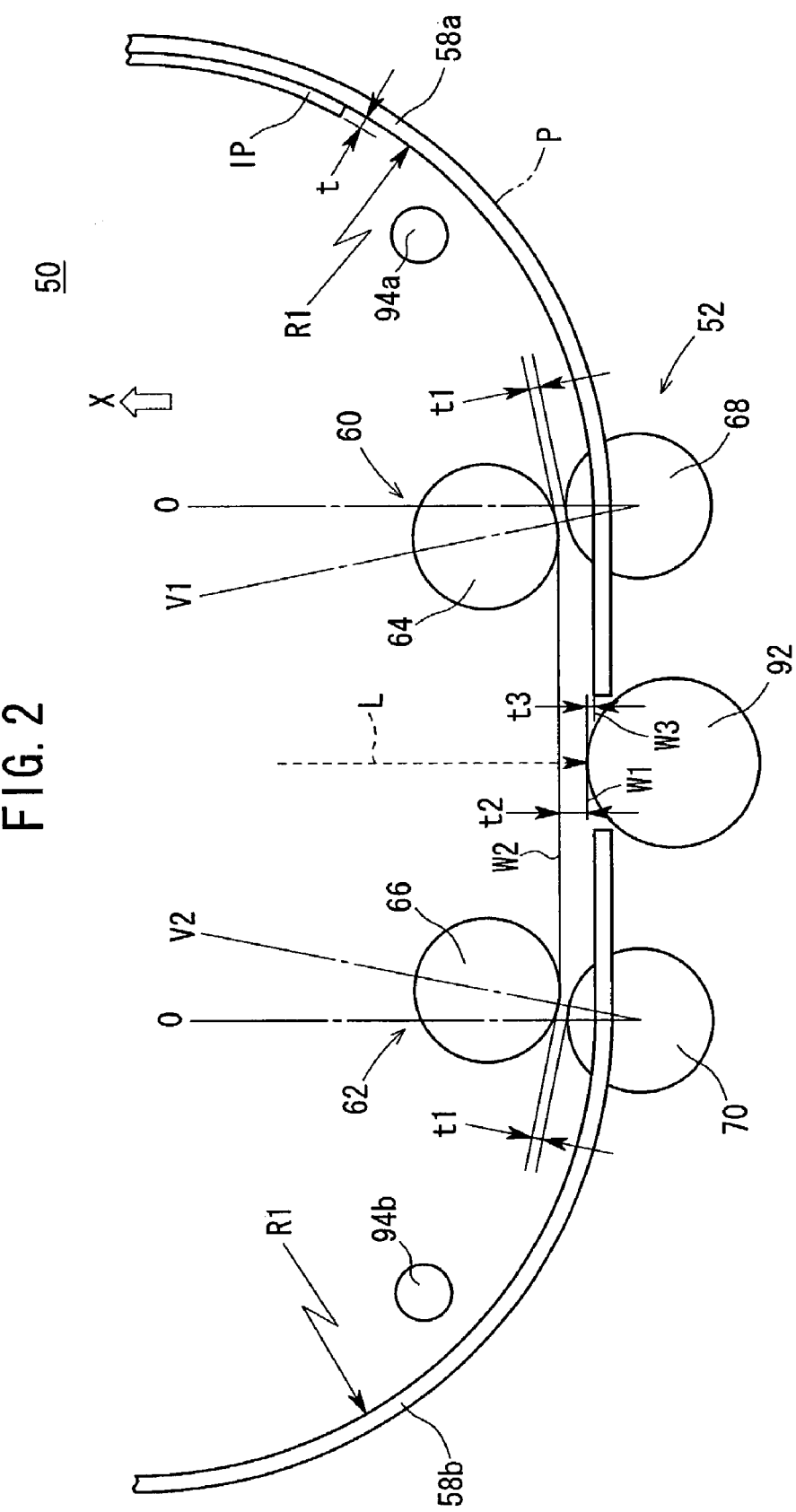
FIG. 2 is an enlarged elevational view of an auxiliary scanning feeding device which serves as the sheet feeding device.

As shown FIGS. 1 and 2, the auxiliary scanning feed mechanism 52 comprises curved feed guides 58a, 58b for guiding the stimulable phosphor sheet IP along a curved feed path, i.e., a feed path having curve sections, P, and first and second roller pairs 60, 62 rotatable in synchronism with each other for feeding the stimulable phosphor sheet IP along the curved feed path P.

The first and second roller pairs 60, 62 comprise respective drive rollers 64, 66 disposed inwardly of the curved sections of the curved feed guides 58a, 58b, and first and second driven rollers 68, 70 which face the respective drive rollers 64, 66 with the stimulable phosphor sheet IP interposed therebetween.

Figure 3:
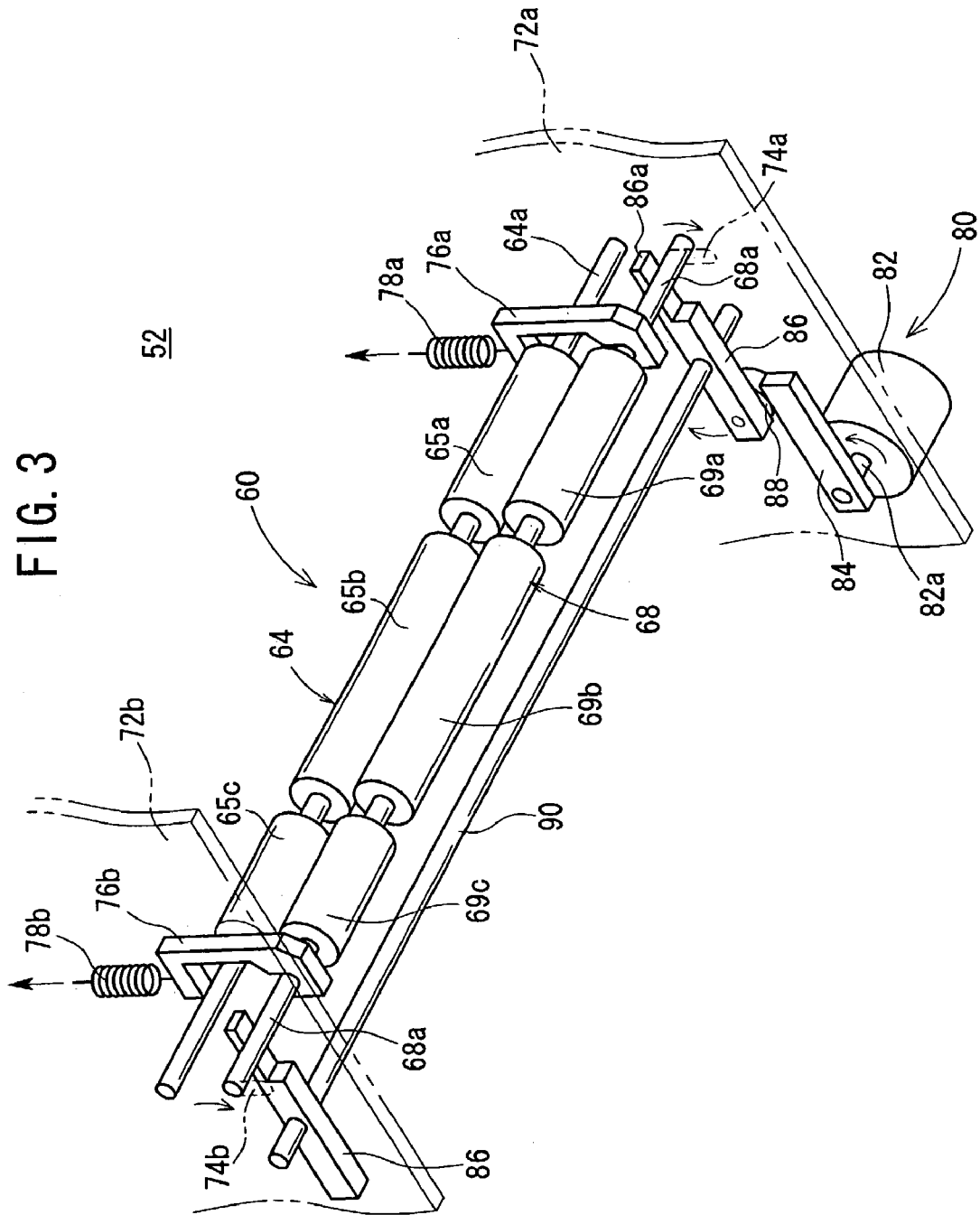
FIG. 3 is a perspective view of the auxiliary scanning feeding device.

As shown in FIG. 3, the first drive roller 64 has a shaft 64a, and a plurality of rollers 65a, 65b, 65c provided coaxially with the shaft 64a. The rollers 65a, 65b, 65c are spaced with each other at a predetermined interval. For example, the roller 65a is provided on a reference side for feeding stimulable phosphor sheets IP of different widths. In the cassette loading regions 20a through 20d of the housing apparatus 12, cassettes 18 for receiving the various widths of stimulable phosphor sheets IP are mounted respectively. The same side of the cassettes 18 is used as the reference side. The stimulable phosphor sheet IP is fed while the stimulable phosphor sheet IP is placed on the reference side. The roller 65a is positioned on the reference side. For example, the widths of the rollers 65a, 65b, 65c are 36 mm, 43 mm, 19 mm, respectively. For example, the nipping force of the reference side is 950 g, and the nipping force of the other side (roller 65c) is 520 g. The shaft 64a is rotatably supported on the support plate 72a, 72b disposed in the apparatus housing 12. The first drive roller 64 is operatively coupled to the second drive roller 66 of the second roller pair 62 by a belt, and is rotated by a rotary actuator, not shown.

The first driven roller 68 has a shaft 68a, and a plurality or rollers 69a, 69b, 69c provided coaxially with the shaft 68a. The rollers 69a, 69b, 69c has the identical structure with the rollers 65a, 65b, 65c, and description thereof is omitted. The shaft 68 is fitted in respective slots 74a, 74b defined in the support plates 72a, 72b. When the first driven roller 68 is positioned in an uppermost position in the slots 74a, 74b, a gap t1 which is equal to or smaller than the thickness t of the stimulable phosphor sheet IP is provided between the first driven roller 68 and the first drive roller 64 (see FIG. 2).

As shown in FIG. 3, opposite ends of the first shaft 68a of the first driven roller 68 are engaged respectively by pressers 76a, 76b, which press the first driven roller 68 upwardly under the bias of respective springs 78a, 78b that are connected to respective upper ends of the pressers 76a, 76b. The first driven roller 68 is engaged by a displacing mechanism 80 for displacing the first driven roller 68 away from the first drive roller 64 outwardly (substantially downwardly) of the curved section of the curved feed guide 58a.

The displacing mechanism 80 includes a rotary solenoid 82 mounted on the first support plate 72a and having a rotatable drive shaft 82a fixed to an end of a first arm 84. The first arm 84 has the other end engaging a bearing 88 mounted on an end of a second arm 86. The second arm 86 is fixed at a substantially central portion thereof to an end of a shaft 90 whose opposite ends are supported by the respective support plates 72a, 72b. The other end of the second arm 86 has an engaging step 86a which engages the shaft 68a of the first driven roller 68. Another second arm 86 is fixed to the other end of the shaft 90 near the support plate 72b.

The second roller pair 62 is identical in structure to the first roller pair 60 and will not be described in detail below.

As shown in FIG. 2, the first drive roller 64 and the first driven roller 68 have respective centers connected by a first central line V1, and the second drive roller 66 and the second driven roller 70 have respective centers connected by a second central line V2. The first and second central lines V1, V2 are inclined toward each other inwardly of the curved sections of the curved feed guides 58a, 58b, i.e., in the direction indicated by the arrow X.

Specifically, the first and second central lines V1, V2 are inclined inwardly at 15° to the vertical line O. The angle at which the first and second central lines V1, V2 are inclined is not limited to 15°, but may be set to a desired angle depending on the rigidity of the stimulable phosphor sheet IP, etc.

Between the first and second roller pairs 60, 62, there is disposed a central roller 92 located in a position where the laser beam L is applied to an inner curved surface of the stimulable phosphor sheet IP and disposed for rolling contact with an outer curved surface of the stimulable phosphor sheet IP. The central roller 92 comprises a free roller or a drive roller. As with the first driven roller 68, the central roller 92 may comprise a plurality or rollers spaced at a predetermined interval. Alternatively, the central roller 92 may comprise a single roller extending in the axial direction. If the roller 92 comprises a single roller, it is possible to prevent the deformation of the stimulable phosphor sheet IP in the main scanning direction. Therefore, an image of high quality can be recorded on the stimulable phosphor sheet IP.

A first tangential line W1 extends through an end of the central roller 92 which is held in contact with the stimulable phosphor sheet IP. A second tangential line W2 extends through respective ends of the first and second drive rollers 64, 66 which are held in contact with the stimulable phosphor sheet IP. A minimum distance t2 between the first tangential line W1 and the second tangential line W2 is set to a value equal to or greater than the thickness t of the stimulable phosphor sheet IP. The first tangential line W1 is spaced from a third tangential line W3 which extends through respective ends of the curved feed guides 58a, 58b which are held in contact with the stimulable phosphor sheet IP, by a minimum distance t3 which is set to a value in the range from 0 mm to 2 mm.

The curved-feed guides 58a, 58b have a radius R1 of curvature in the range from 30 mm to 120 mm. In the illustrated embodiment, the radius R1 of curvature is set to 76 mm. The curved feed guides 58a, 58b include respective straight sections at ends thereof near the first and second rollers 60, 62, which have lengths in the range from 0 mm to 10 mm. In the illustrated embodiment, the lengths of the straight sections are set to 0 mm. Stated otherwise, the curved feed guides 58a, 58b have no straight sections in the illustrated embodiment.

Rotatable guide rollers 94a, 94b are disposed outwardly of the first and second rollers 60, 62 and inwardly of the curved sections of the curved feed guides 58a, 58b, for controlling an attitude of the stimulable phosphor sheet IP as it is fed along the curved feed guides 58a, 58b.

As shown in FIG. 1, the light collecting system 56 has a light guide 96 disposed in a position where the stimulable phosphor sheet IP is scanned by the laser beam L and extending in the main scanning direction, and a photomultiplier 98 mounted on an upper end of the light guide 96.

Operation of the radiation image reading apparatus 10 will be descried below.

The radiation image information of a subject such as a human body, which has been captured by an imaging device (not shown), is recorded on a stimulable phosphor sheet IP, and the stimulable phosphor sheet IP is placed in a cassette 18. The cassette 18 is inserted into the housing apparatus 12 along the cassette loading region 20a, for example. As the cassette 18 is inserted into the housing apparatus 12, the leading end of the cassette 18 pushes a shutter member 29 into an open position, and finds its way into the apparatus housing 12.

Similarly, cassettes 18 housing respective stimulable phosphor sheets IP therein are loaded into the respective cassette loading regions 20b through 20d. Thereafter, the vertically movable sheet feeder 30 is vertically moved to position the vertically movable base 32 in alignment with one of the cassette loading regions 20a through 20d, e.g., the cassette loading region 20a. Then, the stimulable phosphor sheet IP in the cassette 18 loaded in the cassette loading region 20a is attracted and removed by the suction cup 34 out of the cassette 18 through the opening 26. Substantially at the same time that the leading end of the stimulable phosphor sheet IP is gripped by the feed roller pair 36, the stimulable phosphor sheet IP is released from the suction cup 34.

The stimulable phosphor sheet IP is then transferred from the feed roller pair 36 to the feed system 40 and fed downwardly by the roller pairs 38. The stimulable phosphor sheet IP passes through the erasing unit 42 into the reading unit 50.

In the reading unit 50, while the stimulable phosphor sheet IP is being fed in the auxiliary scanning direction indicated by the arrow A by the first and second roller pairs 60, 62 of the auxiliary scanning feed mechanism 52, the optical system 54 applies the laser beam L to the recording surface, which faces upwardly in FIG. 1, of the stimulable phosphor sheet IP in the main scanning direction. The stimulable phosphor sheet IP emits light representative of the radiation image information recorded thereon, and the emitted light is photoelectrically read by the light collecting system 56.

Figure 4:
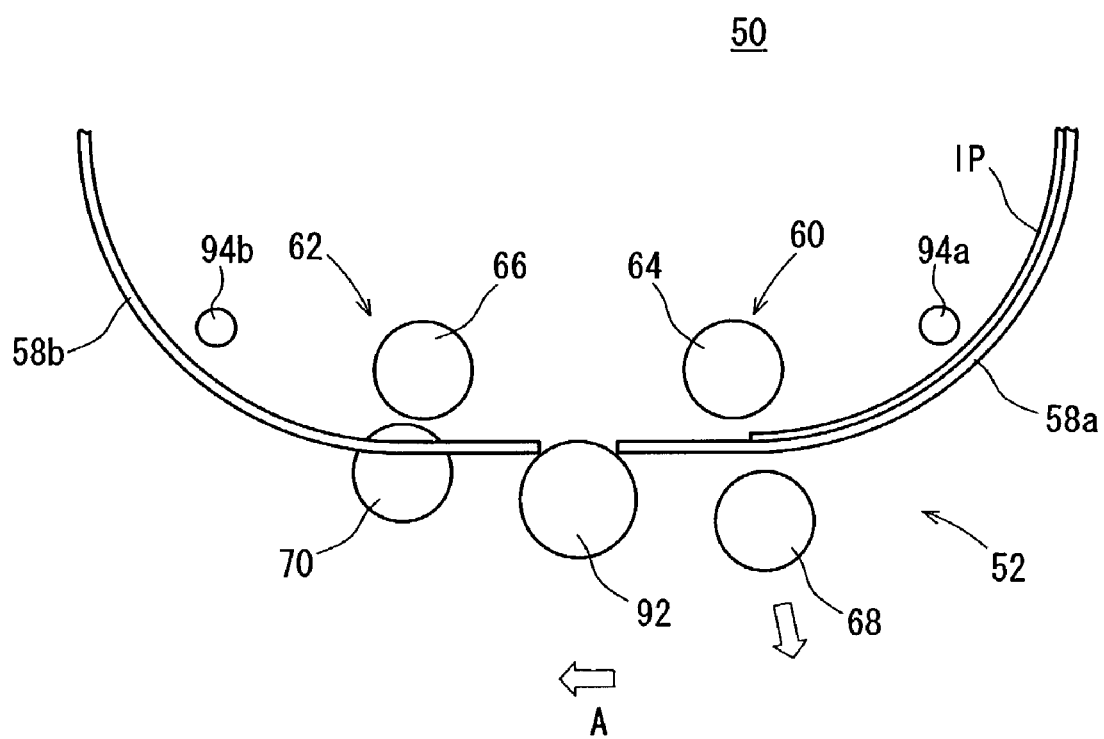
FIG. 4 is an elevational view showing the manner in which the auxiliary scanning feeding device operates when it is supplied with a stimulable phosphor sheet.

Specifically, as shown in FIG. 4, when the stimulable phosphor sheet IP is fed into the reading unit 50, the displacing mechanism 80 (see FIG. 3) associated with the first roller pair 60 is actuated. Specifically, the rotary solenoid 82 is energized to rotate the rotatable drive shaft 82a in the direction indicated by the arrow, angularly moving the first and second arms 84, 86 to displace the first driven roller 68 downwardly away from the first drive roller 64. The gap t1 (see FIG. 2) between the drive roller 64 and the driven roller 68 is widened, allowing the stimulable phosphor sheet IP to be smoothly inserted into the first roller pair 60 without being subject to shocks.

The rotary solenoid 82 is then energized to reverse the rotatable drive shaft 82a to rotate in the direction opposite to the direction indicated by the arrow, whereupon the first driven roller 68 is displaced toward the first drive roller 64 under the bias of the springs 78a, 78b. Therefore, the stimulable phosphor sheet IP is gripped by the first drive roller 64 and the first driven roller 68, and fed in the auxiliary scanning direction indicated by the arrow A by the rotation of the first drive roller 64.

Figure 5:
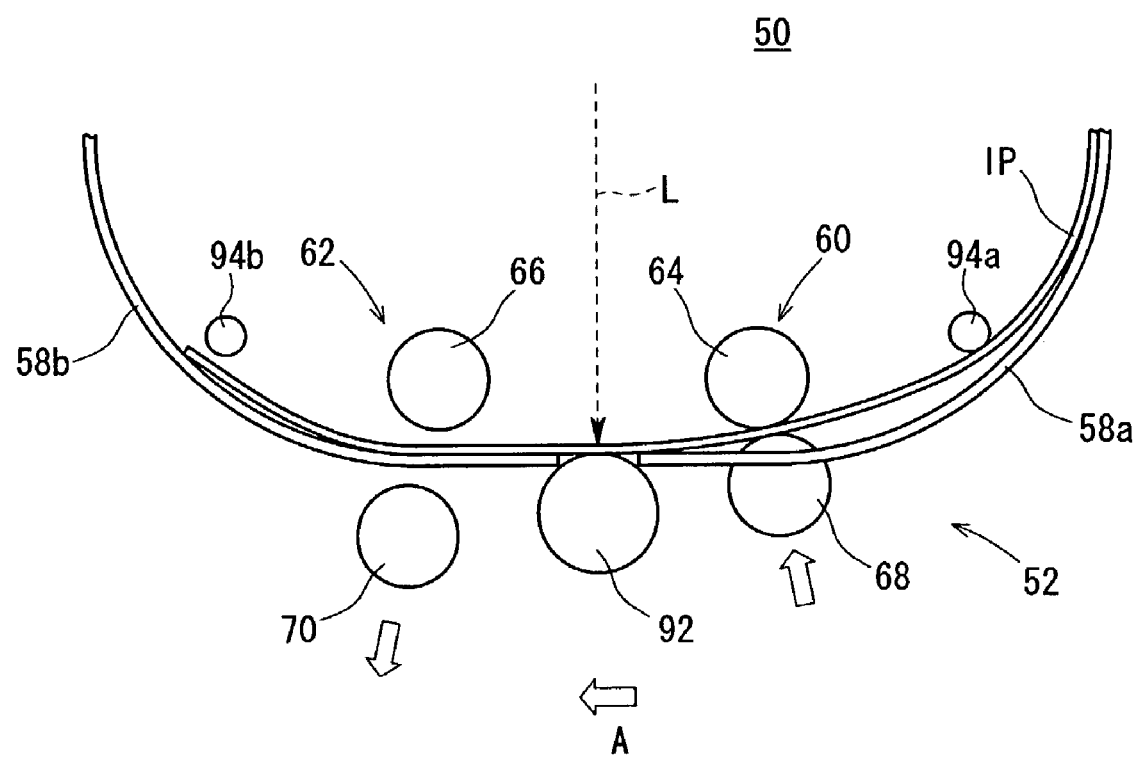
FIG. 5 is an elevational view showing the manner in which the auxiliary scanning feeding device operates when a downstream second roller pair is moved away from the stimulable phosphor sheet.

As shown in FIG. 5, the laser beam L is applied to the stimulable phosphor sheet IP in the main scanning direction at a position aligned with the central roller 92, and the second driven roller 70 of the second roller pair 62 is spaced from the second drive roller 66. The stimulable phosphor sheet IP is fed in the auxiliary scanning direction indicated by the arrow A by the first roller pair 60, with the trailing end thereof being held in contact with the guide roller 94a and controlled in its attitude thereby.

Figure 6:
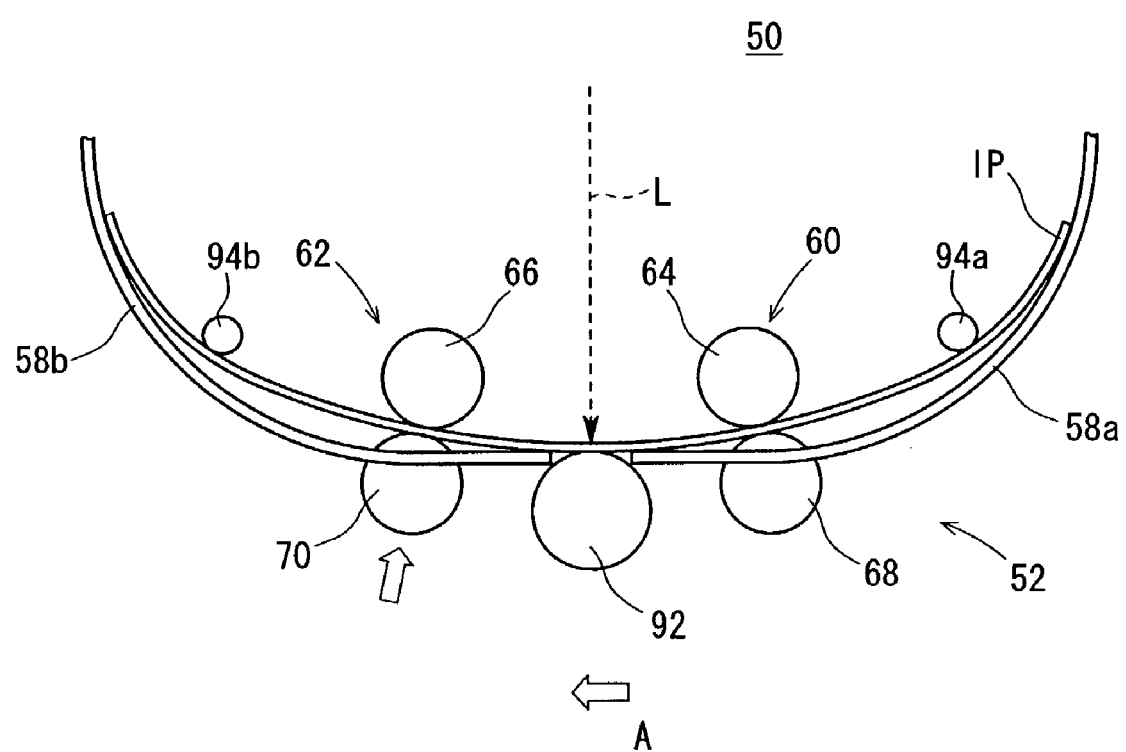
FIG. 6 is an elevational view showing the manner in which the auxiliary scanning feeding device operates when the stimulable phosphor sheet is fed by a first roller pair an the second roller pair.

When the leading end of the stimulable phosphor sheet IP reaches the guide roller 94b, the second driven roller 70 is displaced toward the second drive roller 66. Therefore, as shown in FIG. 6, the stimulable phosphor sheet IP is gripped by the first and second roller pairs 60, 62, and fed in the auxiliary scanning direction indicated by the arrow A by the rotation of the first and second drive rollers 64, 66.

Figure 7:
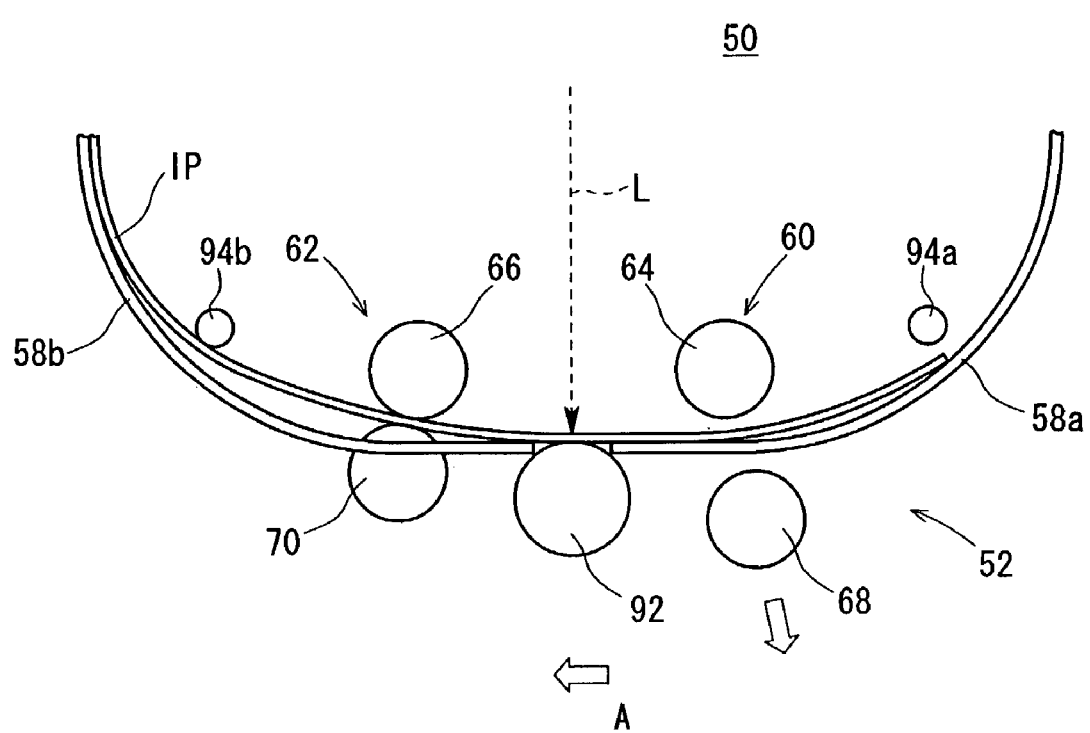
FIG. 7 is an elevational view showing the manner in which the auxiliary scanning feeding device operates when the first roller pair is released.

As shown in FIG. 7, the trailing end of the stimulable phosphor sheet IP disengages from the guide roller 94a, and then the first driven roller 68 of the first roller pair 60 is spaced from the first drive roller 64. The stimulable phosphor sheet IP is thus fed in the auxiliary scanning direction indicated by the arrow A by the second roller pair 62, during which time the radiation image information recorded on the stimulable phosphor sheet IP is continuously read by the light collecting system 56.

In the present embodiment, the first and second drive rollers 64, 66 of the first and second roller pairs 60, 62 are disposed inwardly of the curved sections of the curved feed guides 58a, 58b. The radius R of curvature of the curved feed guides 58a, 58b is set to a considerably small value, e.g., 76 mm, and the curved feed guides 58a, 58b have no straight sections near the first and second roller pairs 60, 62.

Consequently, the rigidity of the stimulable phosphor sheet IP and the tendency thereof to be lifted out of position by the curved feed guides 58a, 58b having the small radius R of curvature are reliably borne or controlled by the first and second drive rollers 64, 66. Thus, the stimulable phosphor sheet IP can stably and accurately be fed in the auxiliary scanning direction with the auxiliary scanning feed mechanism 52 which is of a relatively simple arrangement.

The central roller 92 is disposed between the first and second roller pairs 60, 62, and the first and second central lines V1, V2 of the first and second roller pairs 60, 62 are inclined toward each other in the direction indicated by the arrow X. Therefore, the stimulable phosphor sheet IP gripped by the first and second roller pairs 60, 62 is forcibly pressed against the central roller 92, and the laser beam L is applied to the inner curved surface of the stimulable phosphor sheet IP whose outer curved surface is held by the central roller 92.

Accordingly, even if the stimulable phosphor sheet IP is curled, the stimulable phosphor sheet IP is held in reliable contact with the outer circumferential surface of the central roller 92. The radiation image information recorded on the stimulable phosphor sheet IP thus pressed against and held by the central roller 92 can accurately be read therefrom by the application of the laser beam L thereto.

The stimulable phosphor sheet IP is not lifted out of the outer circumferential surface of the central roller 92. Therefore, the minimum distance between the stimulable phosphor sheet IP and the light guide 96 is small. Therefore, the light collecting efficiency of radiation image information from the stimulable phosphor sheet IP is improved, and a high quality image can be obtained in the radiation image information reading process.

The minimum distance t2 between the first tangential line W1 that is tangential to the central roller 92 and the second tangential line W2 that is tangential to the first and second drive rollers 64, 66 is set to a value equal to or greater than the thickness t of the stimulable phosphor sheet IP. Consequently, the stimulable phosphor sheet IP is not unduly deformed between the first and second roller pairs 60, 62, and can smoothly be fed in the auxiliary scanning direction without being damaged.

The first and second driven rollers 68, 70 of the first and second roller pairs 60, 62 are displaceable toward and away from the respective first and second drive rollers 64, 66 by the displacing mechanism 80. Therefore, no shocks are imposed on the stimulable phosphor sheet IP when the stimulable phosphor sheet IP enters between the first and second roller pairs 60, 62 and disengages from the first and second roller pairs 60, 62.

The stimulable phosphor sheet IP is thus fed smoothly along the continuous curved feed path P that is provided by the curved feed guides 58a, 58b and the first and second drive rollers 64, 66, so that accurate image information can efficiently be obtained from the stimulable phosphor sheet IP. Even if stimulable phosphor sheets IP of different sizes (lengths) are used, the stimulable phosphor sheets IP are not deformed.

The guide rollers 94a, 94b are disposed outwardly of the first and second roller pairs 60, 62 and inwardly of the curved sections of the curved feed guides 58a, 58b. The guide rollers 94a, 94b are effective in stabilizing the shape of the stimulable phosphor sheet IP as it is fed along the curved feed path P, thus allowing the displacement of the first and second driven rollers 68, 70 to be controlled with ease.

The radius R1 of curvature of the curved feed guides 58a, 58b is set to a value in the range from 30 mm to 120 mm, and the curved feed guides 58a, 58b can have respective straight sections whose length ranges from 0 mm to 10 mm near the first and second roller pairs 60, 62. Therefore, the reading unit 50 can effectively be reduced in overall size, and can be used to read recorded image information from not only the stimulable phosphor sheet IP, but also photographic photosensitive sheets, sheets of paper, and other sheets.

As shown in FIG. 3, the first and second roller pairs 60, 62 has a plurality of rollers. The widths and nipping loads of the rollers on the opposite ends are determined such that the nipping load per unit width does not changes. Though the various widths of the stimulable phosphor sheets IP are fed while the stimulable phosphor sheets IP are placed on one side, the stimulable phosphor sheets IP are not deformed. Therefore, it is possible to prevent the stimulable phosphor sheets IP from being damaged. The dimesional accuracy in reading the image can be maintained. Therefore, it is possible to read the image of high quality.

In some applications, a bar code (not shown) indicating information such as a type or a size of the stimulable phosphor sheet IP is attached to the stimulable phosphor sheet IP. The outer circumferential surfaces of the central roller 92 and the first and second driven rollers 68, 70 are reduced in diameter by a depth equal to the thickness of the bar code for clearing the bar code as it moves over the central roller 92 and the first and second driven rollers 68, 70.

As shown in FIG. 1, after the recorded radiation image information is read from the stimulable phosphor sheet IP, the stimulable phosphor sheet IP is fed in the direction indicated by the arrow B, which is opposite to the auxiliary scanning direction, upwardly to the erasing unit 42 by the feed system 40. In the erasing unit 42, the erasing light sources 46 housed in the casing 44 are energized to apply erasing light L0 to the stimulable phosphor sheet IP horizontally fully across the stimulable phosphor sheet IP.

Since the stimulable phosphor sheet IP is continuously fed upwardly by the feed system 40, the erasing light L0 is applied to the entire image recording area of the stimulable phosphor sheet IP, thereby erasing remaining radiation image information from the stimulable phosphor sheet IP.

The stimulable phosphor sheet IP from which the remaining radiation image information has been erased is transferred from the feed system 40 to the vertically movable sheet feeder 30, and then vertically moved to a position aligned with the cassette loading region 20a, for example, where the empty cassette 18 is loaded. The stimulable phosphor sheet IP is returned into the empty cassette 18 by the vertically movable sheet feeder 30, and then the cassette 18 with the stimulable phosphor sheet IP placed therein is removed from the cassette loading region 20a. The removed cassette 18 will subsequently be used for recording next radiation image information on the stimulable phosphor sheet IP placed therein.

Figure 8:
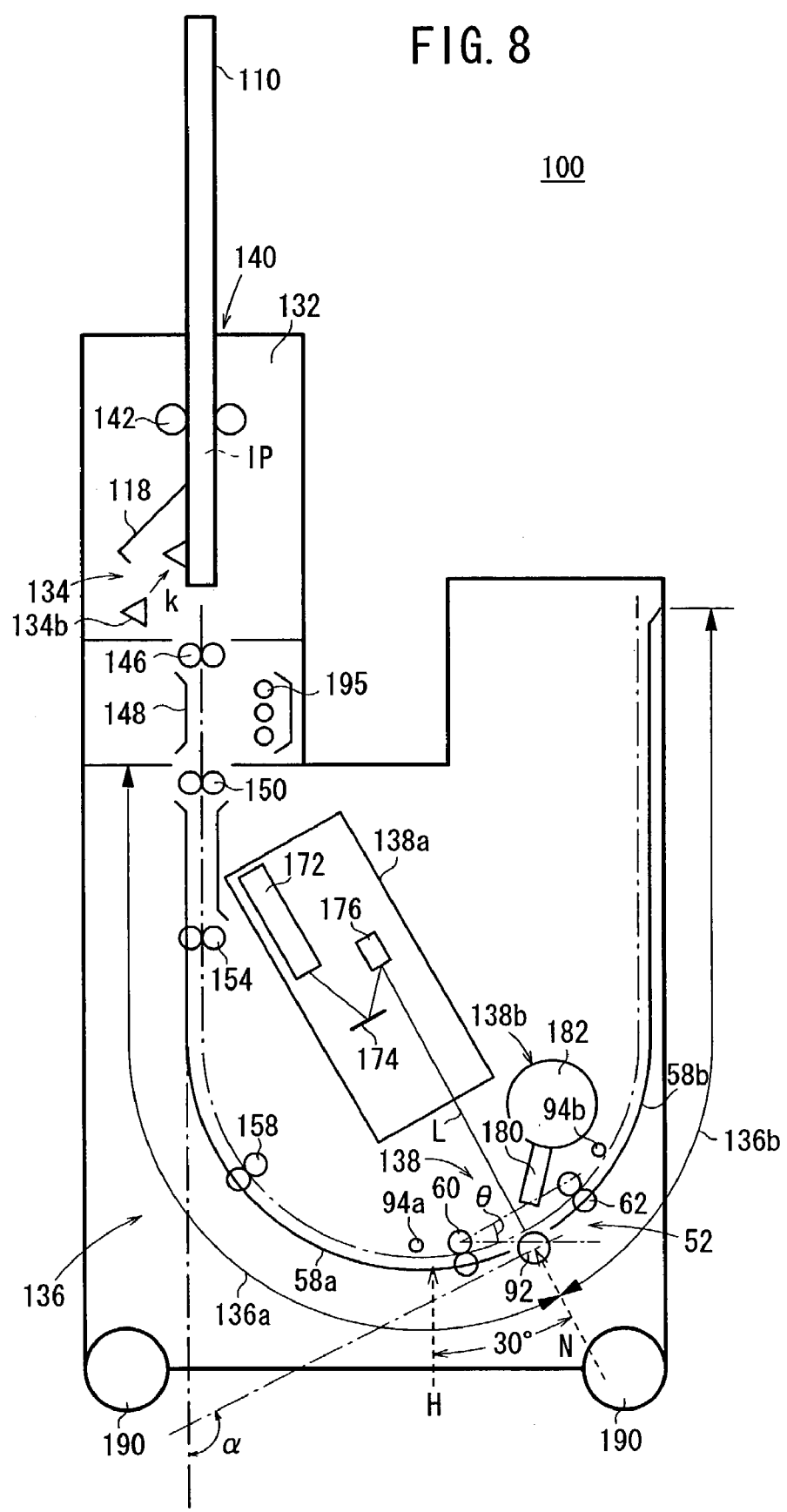
FIG. 8 is a schematic vertical cross-sectional view of a radiation image reading apparatus which incorporates therein a sheet feeding device according to a second embodiment of the present invention.

FIG. 8 schematically shows, in vertical cross section, a radiation image reading apparatus 100 which incorporates therein a sheet feeding device according to a second embodiment of the present invention. The radiation image reading apparatus 100 employs the auxiliary scanning feed mechanism 52 which is the sheet feeding device according to the first embodiment. Those parts of the radiation image reading apparatus 100 which are identical to those according to the first embodiment are denoted by identical reference characters, and will not be described in detail below.

The radiation image reading apparatus 100 comprises a cassette loading region 132 for loading a cassette 110 which houses a stimulable phosphor sheet (radiation image recording sheet) IP therein, a sheet removing means 134 for holding the stimulable phosphor sheet IP in the cassette 110 loaded in the cassette loading region 132 and removing the stimulable phosphor sheet IP from the cassette 110, and a feed mechanism 136 for feeding the stimulable phosphor sheet IP removed by the sheet removing means 134 to a reading unit 138, which reads a radiation image recorded on the stimulable phosphor sheet IP. The feed mechanism 136 feeds the stimulable phosphor sheet IP along a feed path indicated by the dot-and-dash line.

Figure 9:
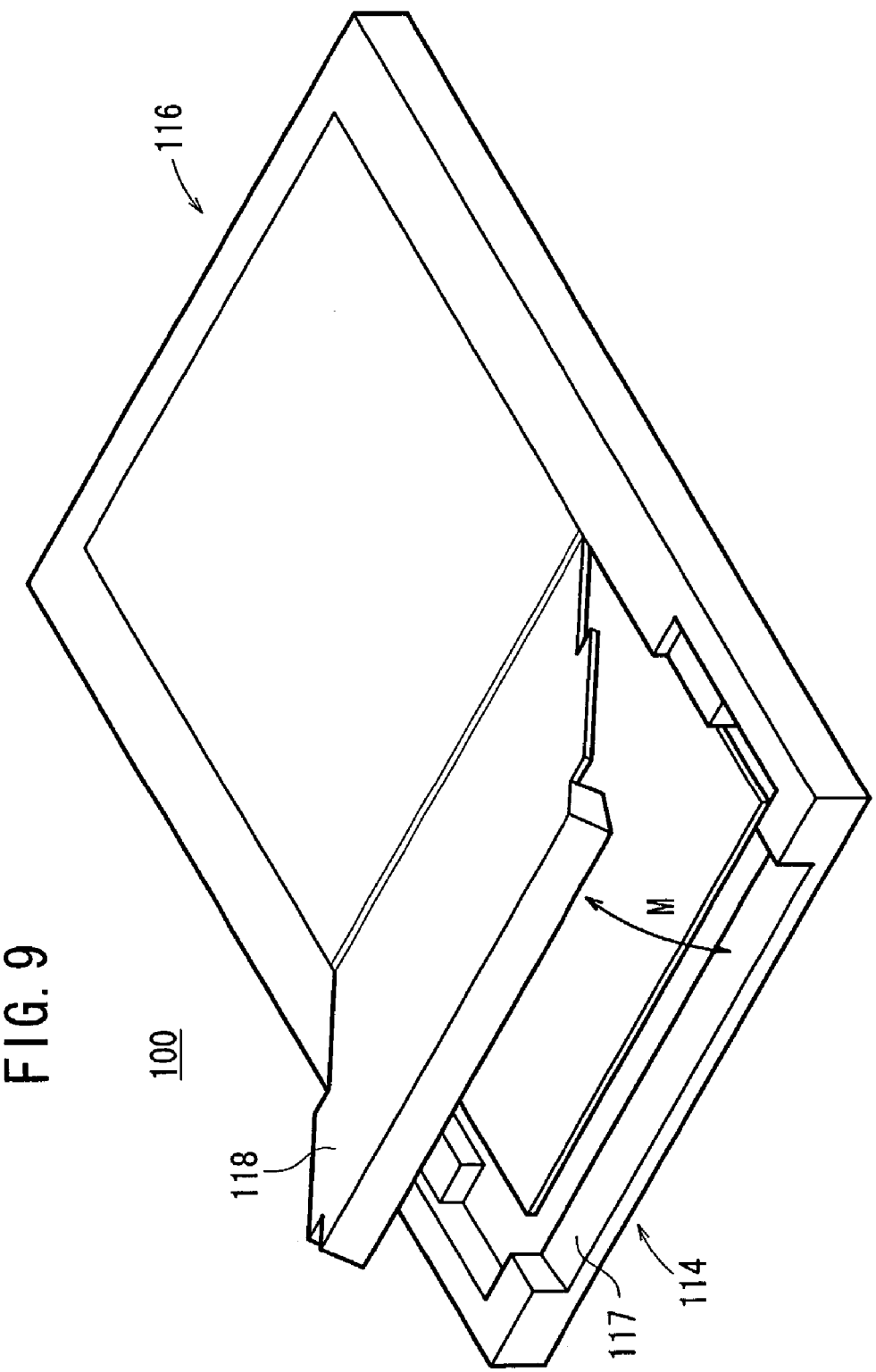
FIG. 9 is a perspective view of a cassette to be loaded into the radiation image reading apparatus shown in FIG. 8.

As shown in FIG. 9, the cassette 110 to be loaded in the radiation image reading apparatus 100 has a casing 116 which stores the stimulable phosphor sheet IP therein. The casing 116 has an opening 117 defined in an end 114 thereof for taking the stimulable phosphor sheet IP into and out of the casing 116 therethrough. The cassette 110 also has a lid 118 pivotally mounted on the casing 116 for closing the opening 117.

The casing 116 and the lid 118 are made of any of various known materials including various synthetic resins, metals such as aluminum, etc. The lid 118 is attached to the casing 116 by a known means such as a hinge or the like so that it can be opened and closed in the direction indicated by the arrow M. The casing 116 and the lid 118 may be constructed as separate members or may be integrally molded of synthetic resin with the lid 118 being openable and closable with respect to the casing 116 in the direction indicated by the arrow M. The stimulable phosphor sheet IP which is placed in the cassette 110 has a radiation-irradiated surface facing the panel of the casing 116 which is opposite to the lid 118.

As shown in FIG. 8, the cassette 110 is vertically loaded in the cassette loading region 132. The cassette 110 thus loaded has the opening 117 positioned at its lower end. The cassette loading region 132 has support rollers 142 for supporting the cassette 110 and an opening means (not shown) for opening the lid 118. The cassette loading region 132 may be arranged to allow a cassette 110 of a different size to be loaded therein.

The sheet removing means 134 has a suction cup 134b movable into and out of the cassette 110 with the lid 118 being open and a suction cup displacing mechanism (not shown) for moving the suction cup 134b in a predetermined direction to allow the suction cup 134b to remove the stimulable phosphor sheet IP from the cassette 110, and feeding the stimulable phosphor sheet IP to a roller pair 146 (described later on). A pump (not shown) for drawing air is connected to the suction cup 134b by a pipe (not shown). The pipe has a leakage valve (not shown) for releasing the stimulable phosphor sheet IP from the suction cup 134b.

The feed mechanism 136 has a U-shaped feed path comprising a front feed path extending in a range indicated by the arrow 136a in FIG. 8, for holding and feeding downwardly the stimulable phosphor sheet IP which has been removed from the cassette loading region 132 and passed through a guide 148 and then feeding upwardly the stimulable .phosphor sheet IP through a lowermost point H to a reading position N, and a rear feed path extending in a range indicated by the arrow 136b in FIG. 8, for feeding upwardly the stimulable phosphor sheet IP which has been fed to the reading position N.

The feed mechanism 136 feeds the stimulable phosphor sheet IP through the U-shaped feed path up to the rear end of the rear feed path, and then feeds the stimulable phosphor sheet IP backwards through the U-shaped feed path to the cassette loading region 132. The front feed path has roller pairs 150, 154, 158, a first roller pair 60, and curved feed guide 58a. The rear feed path has curved feed guide 58b and a second roller pair 62. As with the first and second roller pairs, the roller pairs 146, 150, 154 include a plurality of rollers.

The reading unit 138 comprises an auxiliary scanning feed mechanism (sheet feeding device) 52 for feeding the stimulable phosphor sheet IP in an auxiliary scanning direction, an optical system 138a for emitting a laser beam L as stimulating light, and a light collecting system 138b for detecting light emitted from the stimulable phosphor sheet IP upon exposure to the laser beam L.

The reading unit 138 and the feed mechanism 136 are mounted on a vibroisolating system for reading a recorded radiation image stably and normally from the stimulable phosphor sheet IP even when the radiation image reading apparatus 100 is vibrated. The vibroisolating system is made of vibroisolating rubber, for example. The vibroisolating rubber is placed on a plane which extends through the center of gravity of the scanner (the optical system 138a and the light collecting system 138b). With the use of the vibroisolating system, vibrations are limited. Thus, it is possible obtain a desirable image. According to the second embodiment, each of the front feed path and the rear feed path is substantially of the same length as the stimulable phosphor sheet IP.

To make the radiation image reading apparatus 100 small in size, the optical system 138a and the light collecting system 138b are disposed within the space defined by the U-shaped feed path, and the optical system 138a is inclined to the vertical direction at a predetermined angle which may be anywhere between 0° and 90°, but should preferably be 30°. If the optical system 138a is inclined to the vertical direction at 30°, then the angle θ shown in FIG. 8 is also 30°.

The angle between a feeding vector of a linear portion of the front feed path and a feeding vector at the reading unit 138 is larger than 90° (blunt angle). Therefore, the auxiliary scanning direction at the reading unit 138 is inclined upwardly from the horizontal direction which is perpendicular to the feeding direction of the stimulable phosphor sheet IP removed from the cassette 110 and fed vertically.

The feed guide 148 which is positioned between the cassette loading region 132 and the feed mechanism 136 is combined with an erasing light source 195 for erasing residual image information from the stimulable phosphor sheet IP from which the desired radiation image has been read by the reading unit 138.

The radiation image reading apparatus 100 can be moved around by wheels 190.

Operation of the radiation image reading apparatus 100 will be described below.

The cassette 110 is loaded from a loading slot 140 into the cassette loading region 132, and supported in position by the support rollers 142. The opening means (not shown) is actuated to open the lid 118, as shown in FIG. 8. Then, the suction cup 134*b* is moved in the direction indicated by the arrow K until it abuts against the stimulable phosphor sheet IP in the cassette 110, and attracts the stimulable phosphor sheet IP.

The suction cup displacing mechanism then moves the suction cup 134*b* downwardly to remove the stimulable phosphor sheet IP from the cassette 110. In the second embodiment, a support member (not shown) is disposed in the cassette 110 for supporting the stimulable phosphor sheet IP against falling by gravity out of the cassette 110 when the lid 118 is opened.

The stimulable phosphor sheet IP removed by the suction cup 134*b* is borne by the roller pair 146, and guided by the feed guide 148 into the feed mechanism 136. After the stimulable phosphor sheet IP is held by the roller pair 150, the stimulable phosphor sheet IP is fed downwardly by the roller pairs 154, 158 and the curved feed guide 58*a*. The stimulable phosphor sheet IP moves through the lowermost point H and then is fed upwardly by the first roller pair 60 and a central roller 92 up to the reading position in the reading unit 138.

The stimulable phosphor sheet IP fed into the reading unit 138 is fed upwardly at a predetermined speed in the auxiliary scanning direction by the first and second roller pairs 60, 62 in the auxiliary scanning feed mechanism 52. At the same time, the entire surface of the stimulable phosphor sheet IP is irradiated with the laser beam L.

Specifically, the laser beam L is emitted from a stimulating light source 172 such as an He—Ne laser or the like, and reflected by a mirror 174 to a galvanometer mirror 176. The galvanometer mirror 176 reflects and deflects the laser beam L in a main scanning direction which is substantially perpendicular to the auxiliary scanning direction (upward direction), so that the laser beam L is two-dimensionally applied to the entire surface of the stimulable phosphor sheet IP.

The portion of the stimulable phosphor sheet IP which has been read by the reading unit 138 is further fed upwardly. The portion of the stimulable phosphor sheet IP which has been irradiated with the laser beam L emits light depending on the radiation image information stored in the stimulable phosphor sheet IP. The emitted light is collected by a light collecting guide 180 and applied to a light detector 182 such as a photomultiplier tube or the like, which photoelectrically converts the light into an electric signal. The electric signal is then sent to and processed by a control circuit (not shown), which transmits the processed signal to an image forming apparatus, a CRT (Cathode-Ray Tube), or the like which regenerates the radiation image information as a visible image.

After the radiation image information has been read from the stimulable phosphor sheet IP, the stimulable phosphor sheet IP which has been fed up to the rear end of the feed guide 176 is then fed backwards downwardly by the roller pairs 174, 170 and the curved feed guide 58*b*. The stimulable phosphor sheet IP moves through the lowermost point H and then is fed upwardly by the roller pairs 158, 154, 150 and the curved feed guide 58*a*. While the stimulable phosphor sheet IP is being guided by the feed guide 148, residual image information is erased from the stimulable phosphor sheet IP by the application of erasing light emitted from the erasing light source 195. Thereafter, the stimulable phosphor sheet IP is introduced into the cassette 110 in the cassette loading region 132.

When the stimulable phosphor sheet IP is placed in the cassette 110, it is attracted by the suction cup 134*b* again. The suction cup displacing mechanism displaces the suction cup 134*b* to store the stimulable phosphor sheet IP completely in the cassette 110.

According to the second embodiment, the stimulable phosphor sheet IP which has been removed from the cassette loading region 132 is held and fed downwardly along the front feed path, moves through the lowermost point H, and then is fed upwardly to the reading position N. The stimulable phosphor sheet IP which has been fed to the reading position N is then fed upwardly along the rear feed path.

The reading position N is positioned upstream of the lowermost point H, and hence the starting end of the front feed path may be positioned lower than the rear end of the rear feed path. Therefore, the starting end of the front feed path may be lowered without the need of increasing the dimension in the depth of the radiation image reading apparatus 100. That is, the height of the cassette loading region 132 may be reduced, and the size of the radiation image reading apparatus 100 may be reduced.

With the use of the auxiliary scanning feed mechanism 52, the rigidity of the stimulable phosphor sheet IP and the tendency thereof to be lifted out of position by the curved feed guides 58*a*, 58*b* having the small radius R1 of curvature are reliably borne or controlled. Thus, the stimulable phosphor sheet IP can stably and accurately be fed along the curved feed path in the auxiliary scanning direction. The radiation image reading apparatus 100 can thus be reduced in size reliably and easily.

Because the optical system 138*a* is disposed within the space defined by the U-shaped feed path, the space defined by the U-shaped feed path is effectively utilized, allowing the radiation image reading apparatus 100 to be further reduced in size. If the feed path is of the same length as the stimulable phosphor sheet IP, then the starting end of the front feed path may be further lowered in position.

Figure 10:
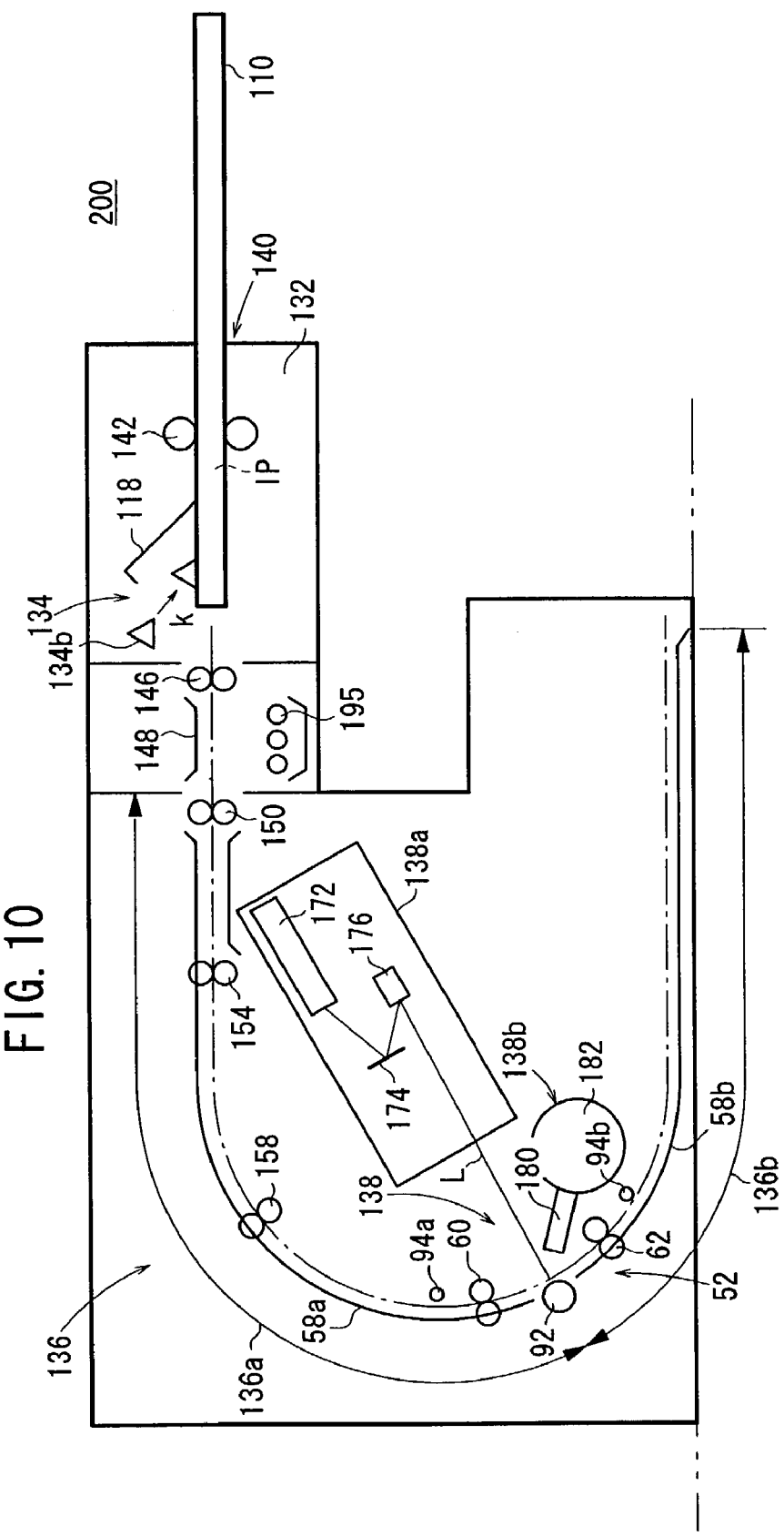
FIG. 10 is a schematic vertical cross-sectional view of a radiation image reading apparatus which incorporates therein a sheet feeding device according to a third embodiment of the present invention.

FIG. 10 schematically shows a radiation image reading apparatus 200 which incorporates therein a sheet feeding device according to a third embodiment of the present invention. The radiation image reading apparatus 200 is similar to the radiation image reading apparatus 100, but placed in a horizontal orientation. The constituent elements of the radiation image reading apparatus 200 that are identical to those of the radiation image reading apparatus 100 are labeled with the same reference numeral, and description thereof is omitted.

Figure 11:
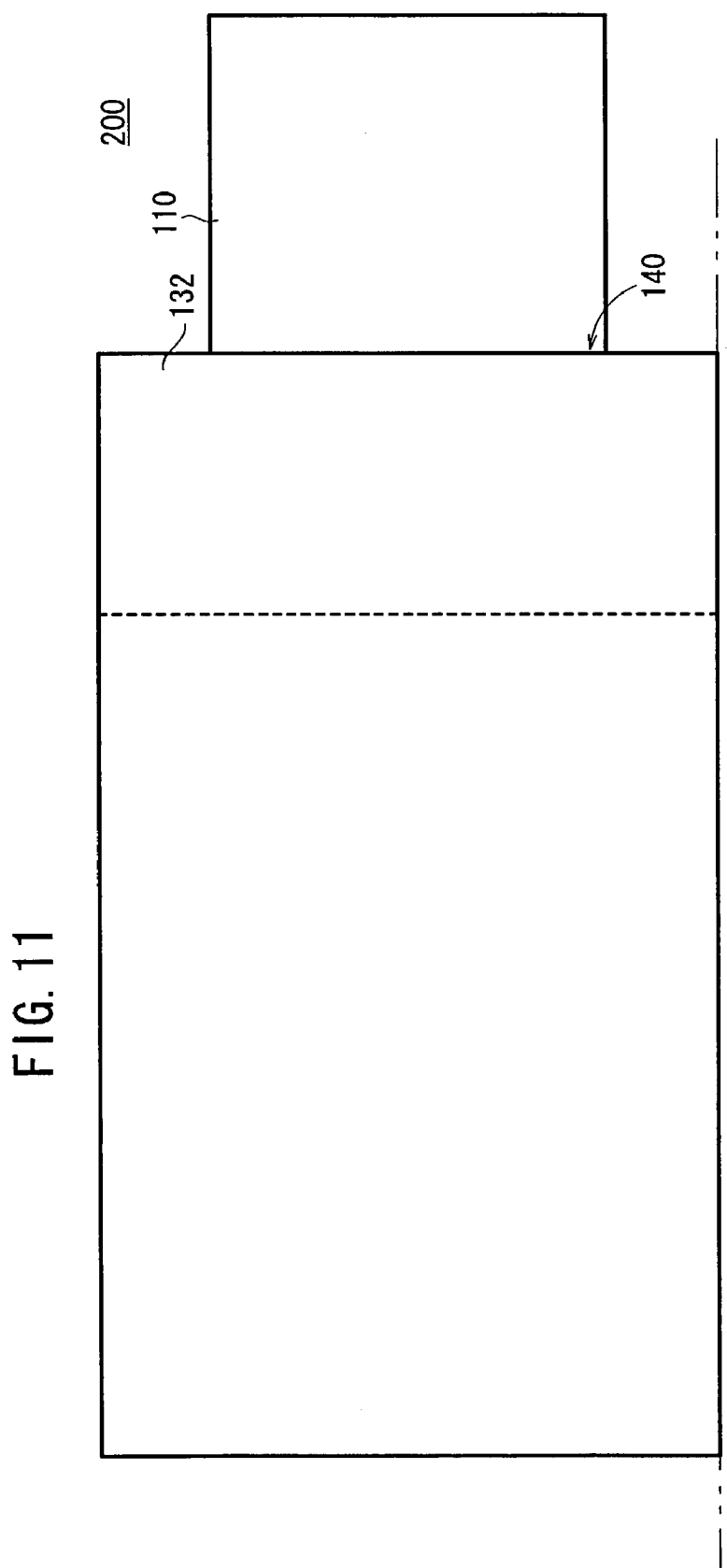
FIG. 11 is a front view of the radiation image reading apparatus shown in FIG. 10 in which the radiation image reading apparatus is placed in a different orientation.
Figure 12:
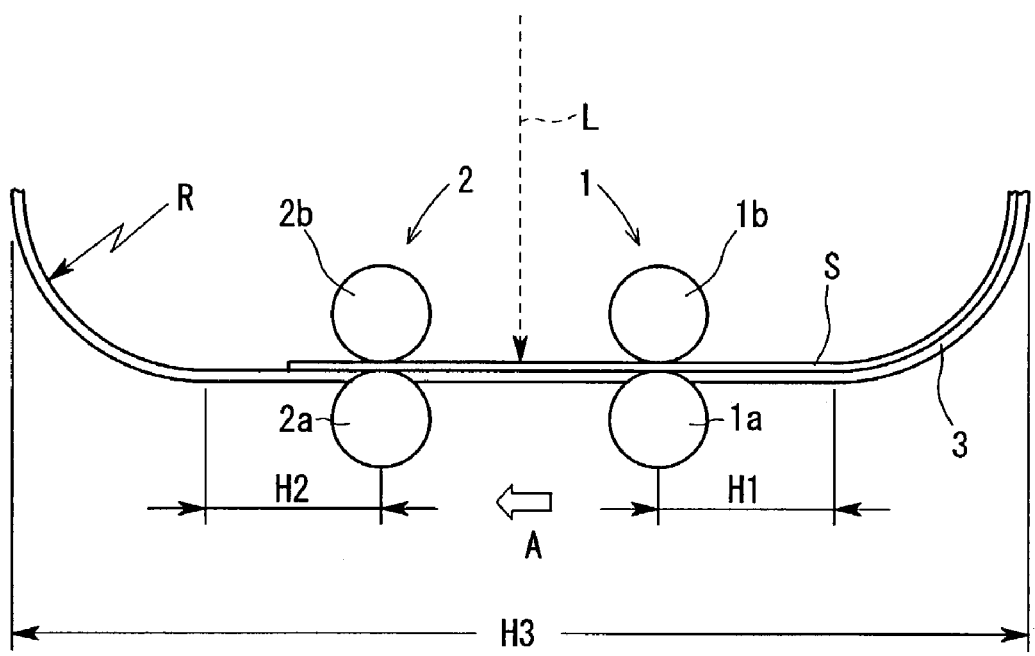
FIG. 12 is an elevational view of a conventional sheet feeding device.

The height of the radiation image reading apparatus 200 is small. Therefore, the radiation image reading apparatus 200,is suitably placed on vehicles or tables where installation space in the vertical direction is limited. FIG. 11 shows another example of the radiation image reading apparatus 200 with the cassette 100 facing the front.

The sheet feeding device according to the present invention has the roller pairs for gripping and feeding the sheet along the curved feed path. The drive rollers of the roller pairs are disposed inwardly of the curved sections of the curved fed path. Consequently, the rigidity of the sheet and the tendency thereof to be lifted out of position due to the small radius of curvature of the curved feed path are reliably borne or controlled by the drive rollers. Thus, the sheet can stably and accurately be fed along the curved feed path having the small radius of curvature, and the sheet feeding device can be reduced in size with ease.

The sheet feeding device which is incorporated in the radiation image reading apparatus allows the overall size of the radiation image reading apparatus to be reliably reduced with a simple arrangement.

Although a certain preferred embodiment of the present invention has been shown and described in detail, it should be understood that various changes and modifications may be made therein without departing from the scope of the appended claims.

What is claimed is:

1. A sheet feeding device for feeding a sheet in an auxiliary scanning direction substantially perpendicular to a main scanning direction of a light beam applied to said sheet for reading an image therefrom and recording an image thereon, said sheet feeding device comprising:
   a curved feed guide for guiding said sheet along a feed path having a curved section; and
   a roller pair for gripping and feeding said sheet along said feed path;
   said roller pair comprising:
      a drive roller disposed inwardly of the curved section of said curved feed guide; and
      a driven roller disposed in facing relation to said drive roller with said sheet interposed therebetween,
   the sheet feeding device further comprising means for applying said light beam to said sheet for reading and recording while said sheet is kept in pressed contact with both said drive roller and said driven roller, and
   a displacing mechanism for displacing said driven roller away from said drive roller outwardly of the curved section of said curved feed guide, and
   at least one guide roller disposed inwardly of the curved section of said curved feed guide, for controlling an attitude of said sheet as said sheet is fed along said curved feed guide,
   wherein said drive roller and said driven rOller are spaced from each other by a gap equal to or smaller than the thickness of said sheet when said sheet is released from said roller pair.

2. A sheet feeding device according to claim 1, wherein said curved feed guide has a radius of curvature ranging from 30 mm to 120 mm, and has a straight section having a length of 10 mm or less at an end thereof near said roller pair.

3. A sheet feeding device for feeding a sheet in an auxillary scanning direction substantially perpendicular to a main scanning direction of a light beam applied to said sheet for reading an image therefrom and recording an image thereon, said sheet feeding device comprising:
   a pair of curved feed guides for guiding said sheet along a feed path having two curved sections provided respectively by said curved feed guides; and
   first and second roller pairs for gripping and feeding said sheet along said feed path;
   said first roller pair comprising:
      a first drive roller disposed inwardly of the curved section of said curved feed guide; and
      a first driven roller disposed in facing relation to said first drive roller with said sheet interposed therebetween;
   said second roller pair comprising:
      a second drive roller disposed inwardly of the curved section of said curved feed guide; and
      a second driven roller disposed in facing relation to said second drive roller with the sheet interposed therebetween,
   wherein the light beam is applied to said sheet between said first roller pair and said second roller pair,
   the sheet feeding device further comprising means for applying said light beam to said sheet for reading and recording while said sheet is kept in pressed contact with said first and second drive roller and said first and second driven roller, and
   a displacing mechanism for displacing said first and second driven rollers away from said first and second drive rollers, respectively, outwardly of the curved sections of said curved feed guides, respectively, and
   at least one guide roller disposed outwardly of said first and second roller pairs and inwardly of each of the curved sections of said curved feed guides, for controlling an attitude of said sheet as said sheet is fed along said curved feed guides,
   wherein said first and second drive rollers and said first and second driven rollers are spaced from each other by a gap equal to or smaller than the thickness of said sheet when said sheet is released from said first and second roller pairs.

4. A sheet feeding device according to claim 3, further comprising:
   a central roller disposed between said first and second roller pairs in a position where the light beam is applied to an inner curved surface of said sheet in the main scanning direction, and disposed for rolling contact with an outer curved surface of said sheet.

5. A sheet feeding device according to claim 4, wherein a first tangential line extending through an end of said central roller which is held in contact with said sheet and a second tangential line extending through respective ends of said first and second drive rollers which are held in contact with said sheet are spaced from each other by a minimum distance set to a value equal to or greater than the thickness of said sheet.

6. A sheet feeding device according to claim 3, wherein said curved feed guides have respective radii of curvature ranging from 30 mm to 120 mm, and have respective straight sections having a length of 10 mm or less at ends thereof near said first and second roller pairs.

7. A radiation image reading apparatus comprising:
   a cassette loading region for loading therein a radiation image recording sheet with a radiation image recorded thereon;
   a feed mechanism having a U-shaped feed path comprising a front feed path for holding and feeding the radiation image recording sheet which has been removed from said cassette loading region to a reading position, said front feed path having a length which is equal to at least the length of the radiation image recording sheet, and a rear feed path for feeding the radiation image recording sheet which has been fed to said reading position, said rear feed path having a length which is equal to at least the length of the radiation image recording sheet, said feed mechanism feeding said radiation image recording sheet through said U-shaped feed path nearly to a rear end of said rear feed path and then feeding said radiation image recording sheet to said cassette loading region;

an auxiliary scanning feed mechanism disposed in said reading position for feeding said radiation image recording sheet in an auxiliary scanning direction along a feed path having a curved section when stimulating light is applied to said radiation image recording sheet;

an optical system for applying the stimulating light to said reading position in said U-shaped feed path; and a light collecting system for reading the radiation image from said radiation image recording sheet which has been irradiated with the stimulating light, wherein said auxiliary scanning feed mechanism comprises:

a curved feed guide for guiding the radiation image recording sheet along the feed path having the curved section; and a roller pair for gripping and feeding said radiation image recording sheet along said feed path;

said roller pair comprising:
  a drive roller disposed inwardly of the curved section of said curved feed guide; and
  a driven roller disposed in facing relation to said drive roller with said radiation image recording sheet interposed therebetween, the radiation image reading apparatus further comprising means for applying said stimulating light to said radiation image recording sheet while said radiation image recording sheet is kept in pressed contact with both said drive roller and said driven roller, and a displacing mechanism for displacing said driven roller away from said drive roller outwardly of the curved section of said curved feed guide, wherein said drive roller and said driven roller are spaced from each other by a gap equal to or smaller than the thickness of said radiation image recording sheet when said radiation image recording sheet is released from said roller pair.

8. A radiation image reading apparatus comprising:

a cassette loading region for loading therein a radiation image recording sheet with a radiation image recorded thereon;

a feed mechanism having a U-shaped feed path comprising a front feed path for holding and feeding the radiation image recording sheet which has been removed from said cassette loading region to a reading position, said front feed path having a length which is equal to at least the length of the radiation image recording sheet, and a rear feed path for feeding the radiation image recording sheet which has been fed to said reading position, said rear feed path having a length which is equal to at least the length of the radiation image recording sheet, said feed mechanism feeding said radiation image recording sheet through said U-shaped feed path nearly to a rear end of said rear feed path and then feeding said radiation image recording sheet to said cassette loading region;

an auxiliary scanning feed mechanism disposed in said reading position for feeding said radiation image recording sheet in an auxiliary scanning direction along a feed path having a curved section when stimulating light is applied to said radiation image recording sheet;

an optical system for applying the stimulating light to said reading position in said U-shaped feed path; and a light collecting system for reading the radiation image from said radiation image recording sheet which has been irradiated with the stimulating light, wherein said auxiliary scanning feed mechanism comprises:

a pair of curved feed guides for guiding the radiation image recording sheet along the feed path having two curved sections provided respectively by said curved feed guide; and first and second roller pairs for gripping and feeding said radiation image recording sheet along said feed path;

said first roller pair comprising:
  a first drive roller disposed inwardly of the curved section of said curved feed guide; and
  a first driven roller disposed in facing relation to said first drive roller with said radiation image recording sheet interposed therebetween;

said second roller pair comprising:
  a second drive roller disposed inwardly of the curved section of said curved feed guide; and
  a second driven roller disposed in facing relation to said second drive roller with said radiation image recording sheet interposed therebetween, the radiation image reading apparatus further comprising means for applying said stimulating light to said radiation image recording sheet for reading and recording while said radiation image recording sheet is kept in pressed contact with said first and second drive rollers and said first and second driven rollers, and a displacing mechanism for displacing said first and second driven rollers away from said first and second drive rollers, respectively, outwardly of the curved sections of said curved feed guides, respectively, wherein said first and second drive rollers and said first and second driven rollers are spaced from each other by a gap equal to or smaller than the thickness of said radiation image recording sheet when said radiation image recording sheet is released from said first and second roller pairs.

9. A radiation image reading apparatus according to claim 7, wherein said front feed path and said rear feed path are mounted on a vibroisolating system.

10. A radiation image reading apparatus according to claim 7, wherein said optical system is disposed within a space defined by said U-shaped feed path.

11. A radiation image reading apparatus according to claim 7, wherein said front feed path holds and feeds downwardly the radiation image recording sheet which has been removed from said cassette loading region, then feeds upwardly the radiation image recording sheet through a lowermost point to said reading position, and said rear feed path feeds upwardly the radiation image recording sheet which has been fed to said reading position.

12. The radiation image reading apparatus according to claim 7, wherein said curved feed guide has a radius of curvature ranging from 30 mm to 120 mm, and has a straight section having a length of 10 mm or less at an end thereof near said roller pair.

13. The radiation image reading apparatus according to claim 8, wherein said curved feed guides have respective radii of curvature ranging from 30 mm to 120 mm, and have respective straight sections having a length of 10 mm or less at ends thereof near said first and second roller pairs.

14. A radiation image reading apparatus according to claim 8, wherein said front feed path and said rear feed path are mounted on a vibroisolating system.

15. A radiation image reading apparatus according to claim 8, wherein said optical system is disposed within a space defined by said U-shaped feed path.

16. A radiation image reading apparatus according to claim 8, wherein said front feed path holds and feeds downwardly the radiation image recording sheet which has been removed from said cassette loading region, then feeds upwardly the radiation image recording sheet through a lowermost point to said reading position, and said rear feed path feeds upwardly the radiation image recording sheet which has been fed to said reading position.

* * * * *